US010711093B2

(12) United States Patent
Moon et al.

(10) Patent No.: US 10,711,093 B2
(45) Date of Patent: Jul. 14, 2020

(54) ION EXCHANGE SEPARATION MEMBRANE, ELECTROCHEMICAL CELL INCLUDING SAME, FLOW CELL AND FUEL CELL, AND MANUFACTURING METHOD THEREOF

(71) Applicant: LG CHEM, LTD., Seoul (KR)

(72) Inventors: Sikwon Moon, Daejeon (KR); Tae Geun Noh, Daejeon (KR); Sungyeon Kim, Daejeon (KR); Sujin Byun, Daejeon (KR); Bong Hyun Jeong, Daejeon (KR); Geungi Min, Daejeon (KR); Jeongbae Lee, Daejeon (KR)

(73) Assignee: LG CHEM, LTD., Seoul (KR)

(*) Notice: Subject to any disclaimer, the term of this patent is extended or adjusted under 35 U.S.C. 154(b) by 132 days.

(21) Appl. No.: 16/067,913

(22) PCT Filed: Feb. 21, 2017

(86) PCT No.: PCT/KR2017/001884
§ 371 (c)(1),
(2) Date: Jul. 3, 2018

(87) PCT Pub. No.: WO2017/171239
PCT Pub. Date: Oct. 5, 2017

(65) Prior Publication Data
US 2019/0321814 A1    Oct. 24, 2019

(30) Foreign Application Priority Data
Mar. 31, 2016  (KR) .................. 10-2016-0039731

(51) Int. Cl.
| C08G 61/12 | (2006.01) |
| C08J 5/22 | (2006.01) |
| H01M 8/1004 | (2016.01) |
| H01M 8/1023 | (2016.01) |
| H01M 8/1039 | (2016.01) |
| H01M 8/1072 | (2016.01) |
| H01M 8/18 | (2006.01) |
| B01J 39/20 | (2006.01) |
| B01J 41/14 | (2006.01) |
| H01M 8/1032 | (2016.01) |
| H01M 8/1018 | (2016.01) |

(52) U.S. Cl.
CPC ............ *C08G 61/12* (2013.01); *B01J 39/20* (2013.01); *B01J 41/14* (2013.01); *C08J 5/2237* (2013.01); *H01M 8/1004* (2013.01); *H01M 8/1023* (2013.01); *H01M 8/1032* (2013.01); *H01M 8/1039* (2013.01); *H01M 8/1072* (2013.01); *H01M 8/188* (2013.01); *C08J 2327/18* (2013.01); *H01M 2008/1095* (2013.01)

(58) Field of Classification Search
CPC . B01J 39/20; B01J 41/14; C08J 5/2237; C08J 2327/18; H01M 8/1004; H01M 8/1023; H01M 8/1032; H01M 8/1039; H01M 8/1072; H01M 8/188; H01M 2008/1095
See application file for complete search history.

(56) References Cited

U.S. PATENT DOCUMENTS

| 4,116,781 A | * | 9/1978 | Dorio .................. C08J 5/2293 205/351 |
| 4,127,457 A | * | 11/1978 | Krumpelt .............. C25B 1/46 205/532 |
| 4,217,198 A | * | 8/1980 | Kadija ................. C08J 5/2293 204/252 |
| 2005/0053807 A1 | * | 3/2005 | Breault ............ H01M 8/04223 429/414 |
| 2008/0038623 A1 | | 2/2008 | Schmidt et al. |
| 2014/0017599 A1 | * | 1/2014 | Merlo ................ B01D 67/0006 429/494 |
| 2016/0099480 A1 | * | 4/2016 | Nie ..................... H01M 8/188 429/499 |

FOREIGN PATENT DOCUMENTS

| JP | 63-62157 A | 3/1988 |
| JP | 2007-280845 A | 10/2007 |
| JP | 2010-45024 A | 2/2010 |

OTHER PUBLICATIONS

Cao et al., "Novel acid-base hybrid membrane based on amine-functionalized reduced graphene oxide and sulfonated polyimide for vanadium redox flow battery," Electrochimica Acta, vol. 158, 2015 (Available online Jan. 28, 2015), pp. 24-34.
Deligöz et al., "Synthesis and characterization of anhydrous conducting polyimide/ionic liquid complex membranes via a new route for high-temperature fuel cells," Polym. Adv. Technol., vol. 23, 2012 (published online Jul. 19, 2011), pp. 1156-1165.
Kausar et al., "Properties of Phosphoric Acid Doped Poly(benzimidazole/sulfone/siloxane/amide)/ Sulfonated Polystyrene/Silica Nanoparticle-based Proton Exchange Membranes for Fuel Cells," Chinese Journal of Polymer Science, vol. 32, No. 10, 2014, pp. 1319-1328.
Loureiro et al., "New Proton Conductive Membranes Based on Acid-Doped Interpenetrating Polymer Networks," ECS Transactions, vol. 45, No. 23, 2013, pp. 11-19.
Partial Supplementary European Search Report for European Application No. 17775664.0, dated Oct. 22, 2018.
Yin et al., "Sulfonated polyimides with flexible aliphatic side chains for polymer electrolyte fuel cells," Journal of Membrane Science, vol. 367, 2011 (Available online Nov. 3, 2010), pp. 211-219.
Yuan et al., "Advanced porous membranes with ultra-high selectivity and stability for vanadium flow batteries," Energy & Environmental Science, vol. 9, Oct. 13, 2015, pp. 441-447.

(Continued)

Primary Examiner — Anca Eoff
(74) Attorney, Agent, or Firm — Birch, Stewart, Kolasch & Birch, LLP

(57) ABSTRACT

The present specification relates to an ion exchange membrane, an electrochemical cell, a flow battery and a fuel cell comprising the same, and a method for manufacturing the same.

12 Claims, 9 Drawing Sheets

(56) References Cited

OTHER PUBLICATIONS

Zhang et al., "Sulfonated polyimide/AlOOH composite membranes with decreased vanadium permeability and increased stability for vanadium redox flow battery," J Solid State Electrochem, vol. 18, 2014 (Published online Jul. 18, 2014), pp. 3479-3490.

* cited by examiner

[FIG. 1]
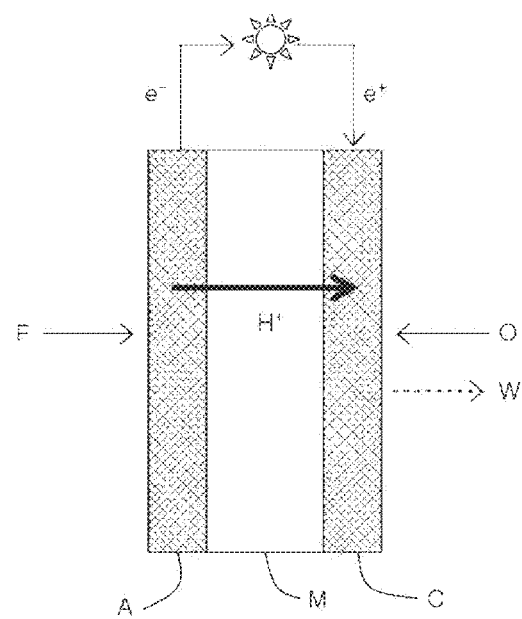

【FIG. 2】
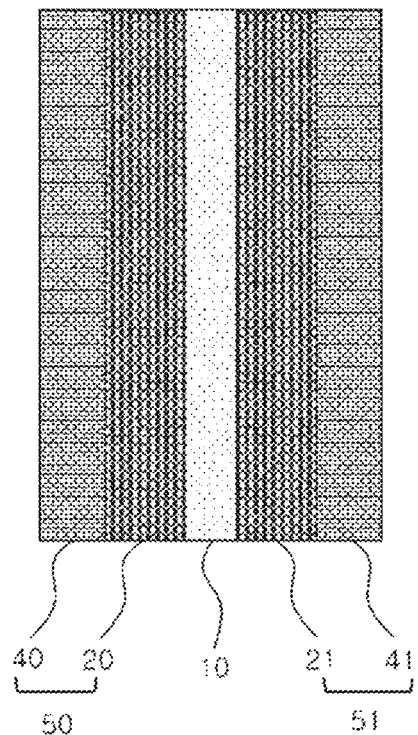
【FIG. 3】
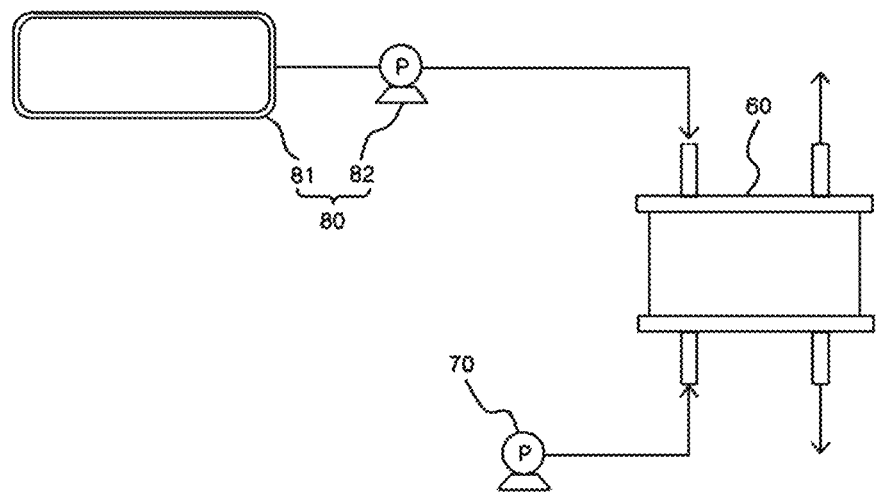

[FIG. 4]
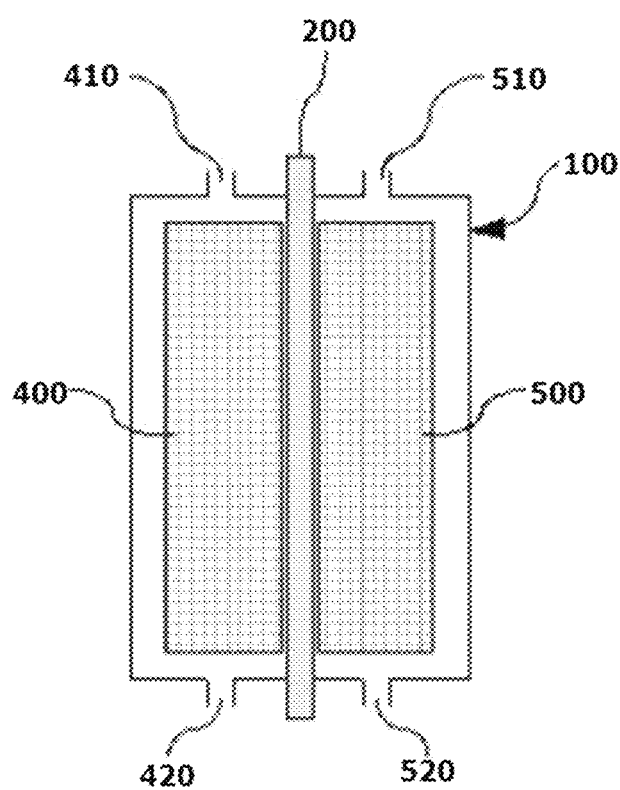

[FIG. 5]
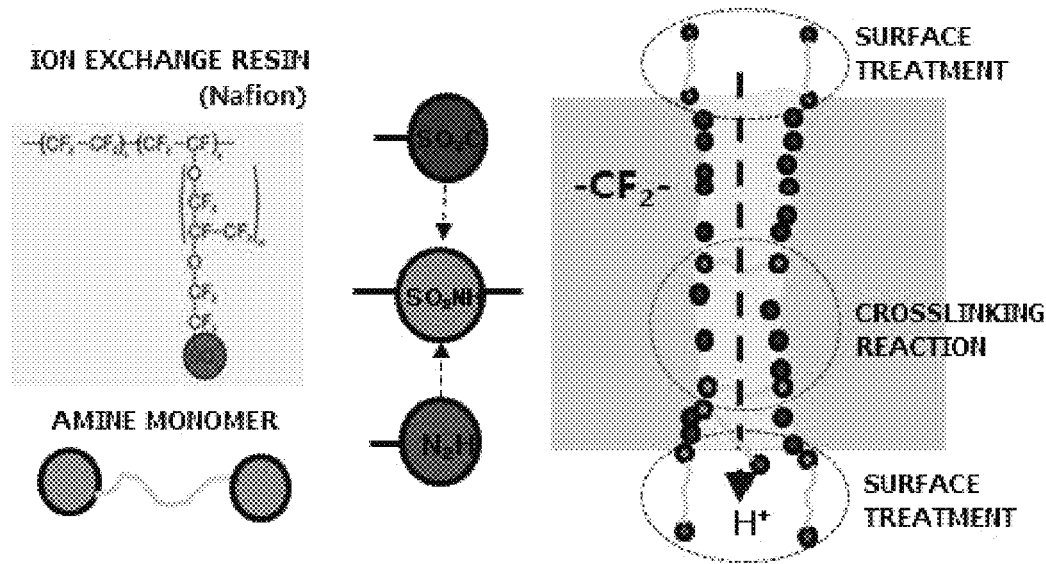

[FIG. 6]
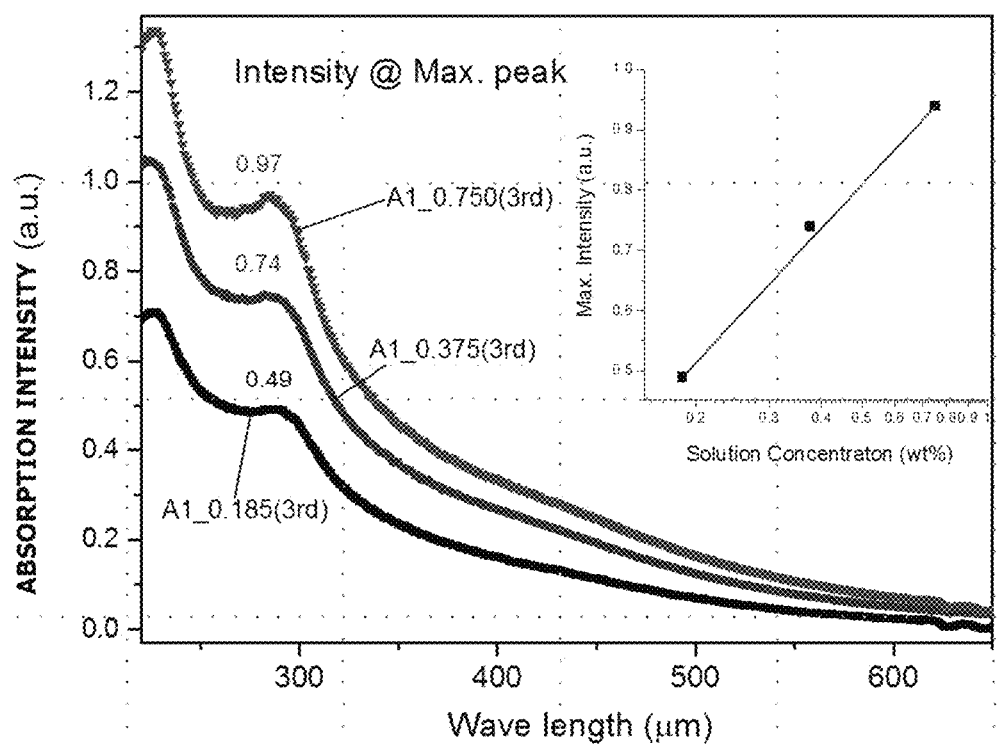

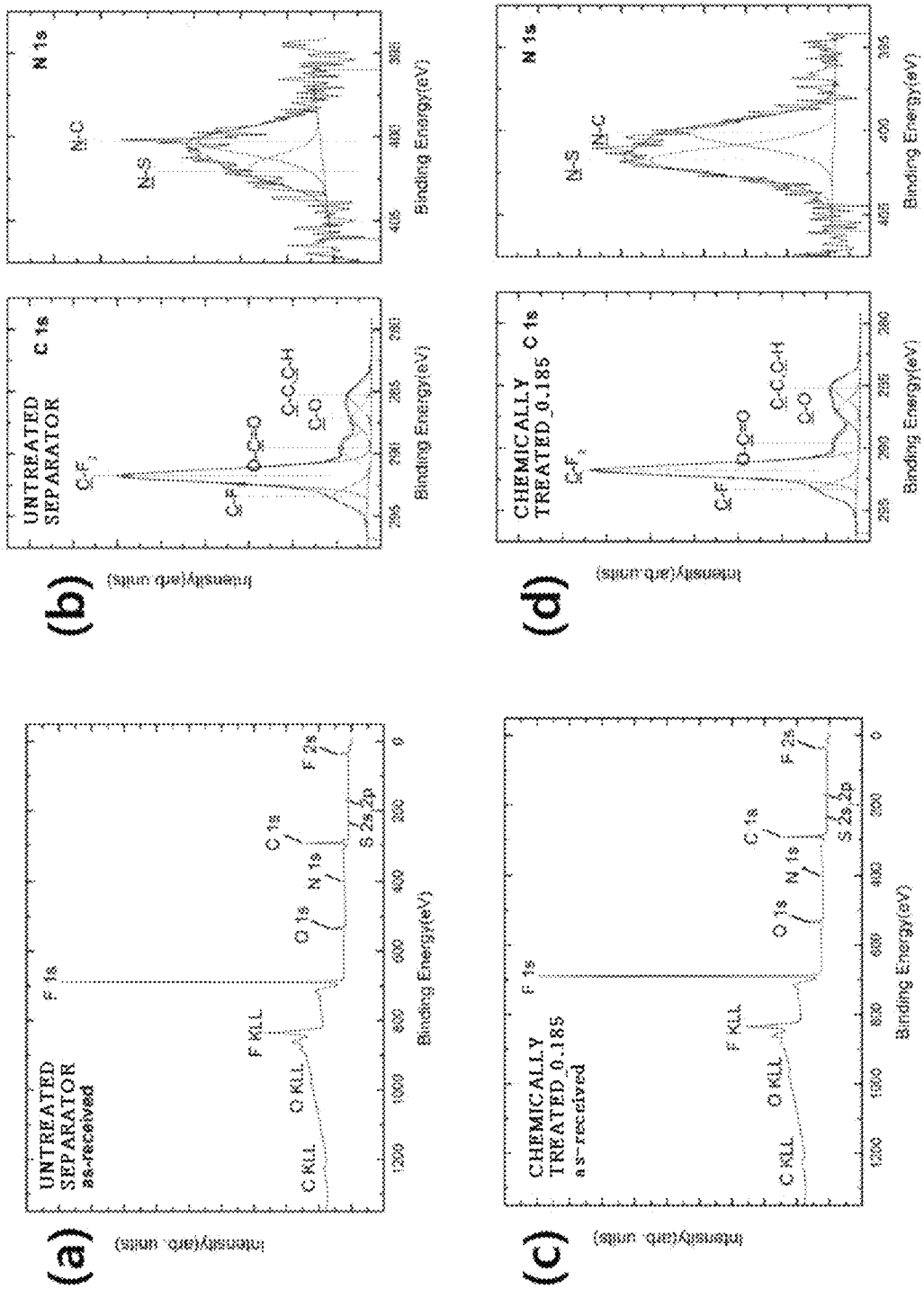
[FIG. 7]

[FIG. 8]
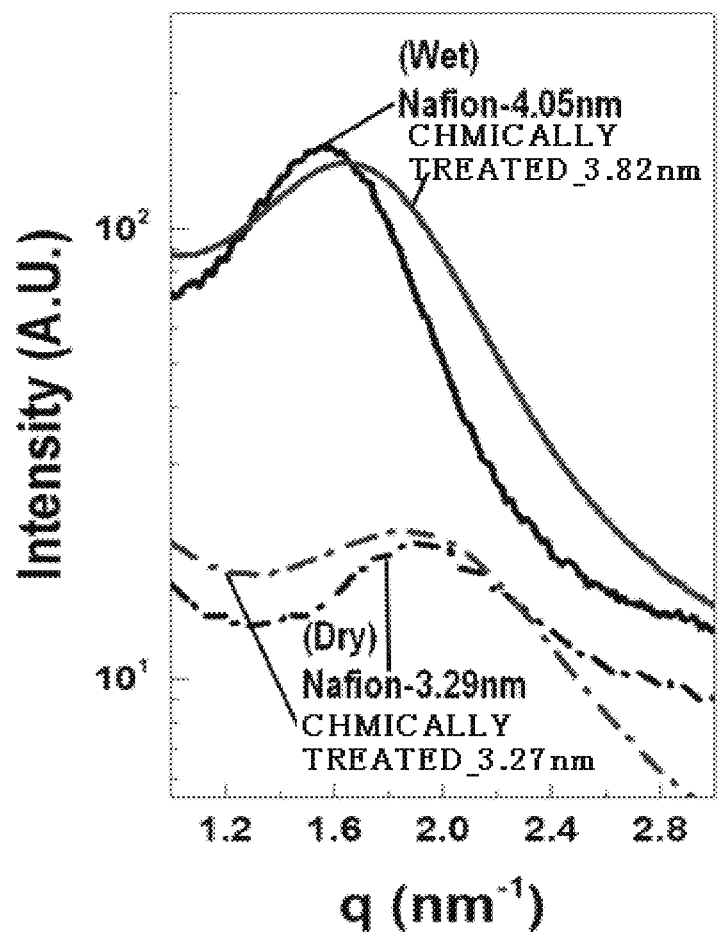

[FIG. 9]
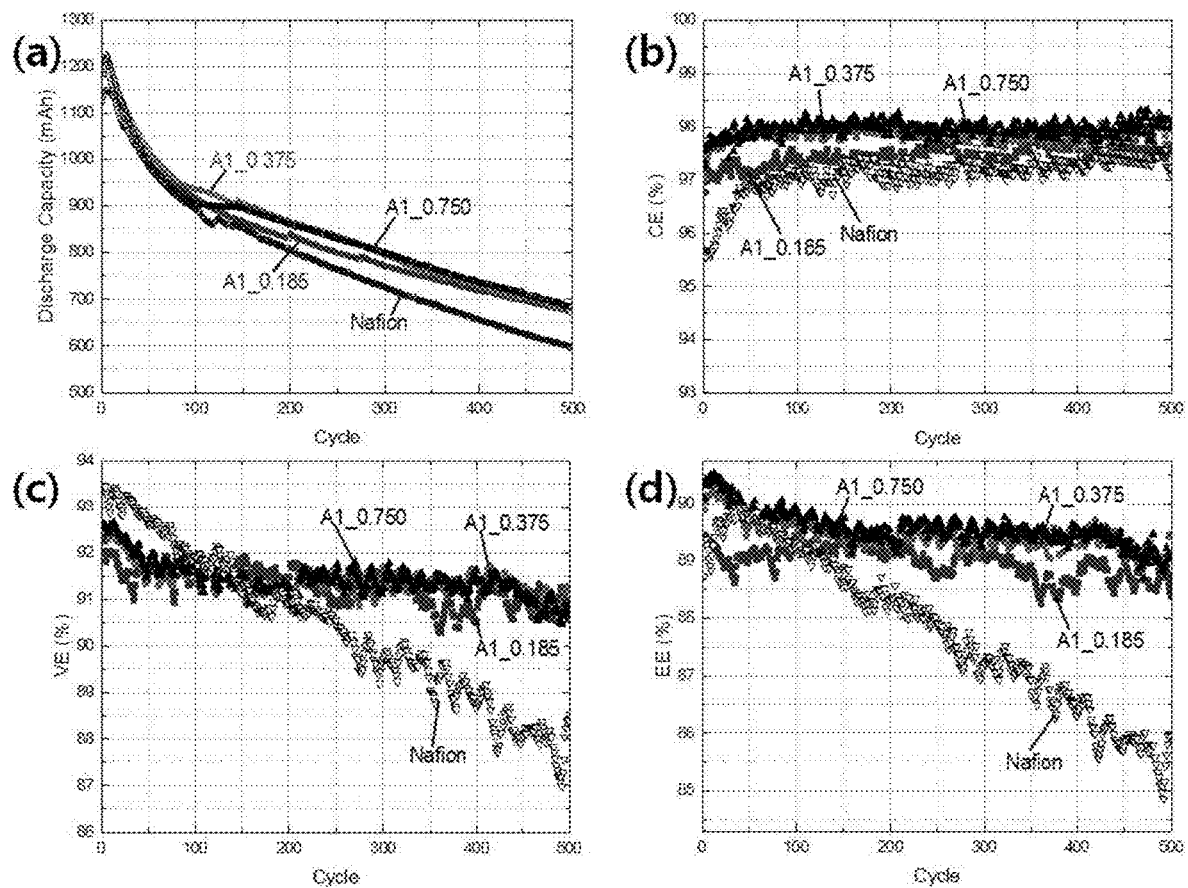

[FIG. 10]
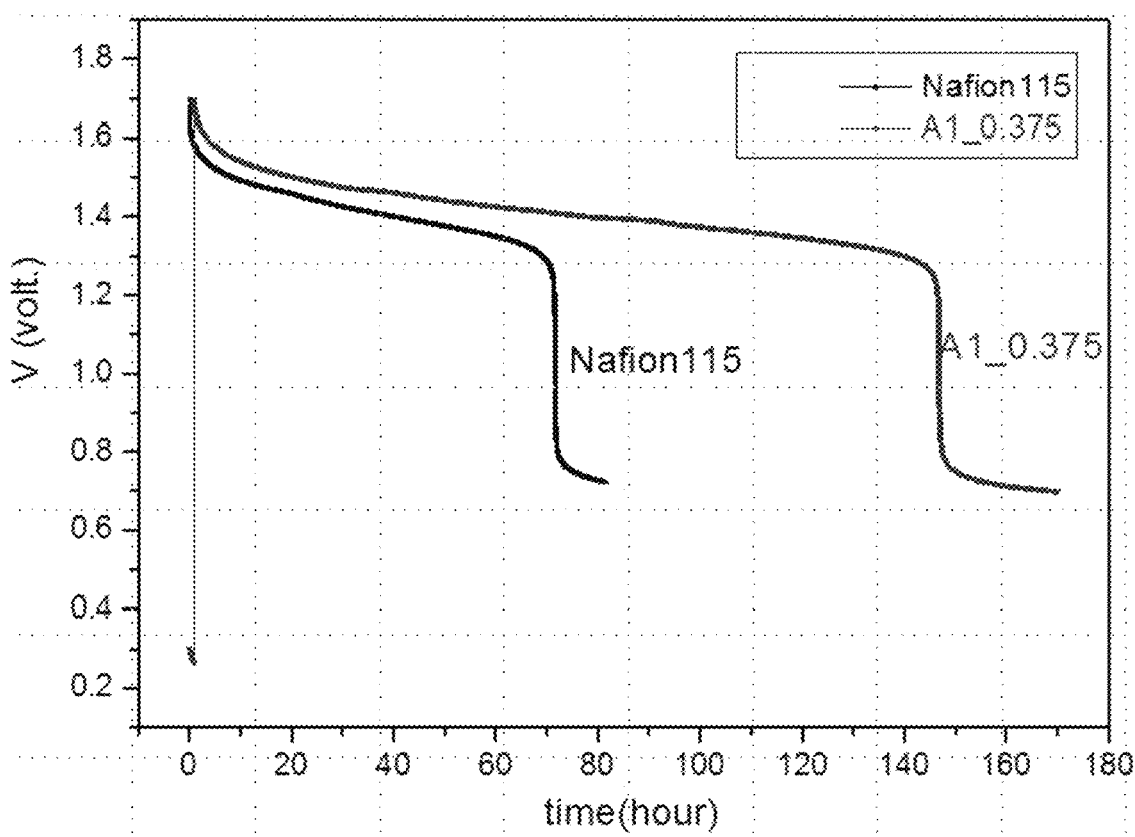

ION EXCHANGE SEPARATION MEMBRANE, ELECTROCHEMICAL CELL INCLUDING SAME, FLOW CELL AND FUEL CELL, AND MANUFACTURING METHOD THEREOF

TECHNICAL FIELD

The present disclosure claims priority to and the benefits of Korean Patent Application No. 10-2016-0039731, filed with the Korean Intellectual Property Office on Mar. 31, 2016, the entire contents of which are incorporated herein by reference.

The present specification relates to an ion membrane, an electrochemical cell, a flow battery and a fuel cell comprising the same, and a method for manufacturing the same.

BACKGROUND ART

A fuel cell is an energy conversion device directly converting chemical energy of fuel into electric energy. In other words, a fuel cell employs a power generation method utilizing a fuel gas and an oxidizer, and using electrons generated during the oxidation and reduction reactions thereof to produce power. A membrane-electrode assembly (MEA) of a fuel cell is a part where an electrochemical reaction of hydrogen and oxygen occurs, and is formed with a cathode, an anode and an electrolyte membrane, that is, an ion exchange electrolyte membrane.

A redox flow battery (oxidation-reduction flow battery) is a system charged and discharged by active materials comprised of an electrolytic solution being oxidized and reduced, and is an electrochemical storage device directly storing chemical energy of the active materials as electric energy. A unit cell of the redox flow battery comprises an electrode, an electrolytic solution comprising an electrode active material, and an ion-exchange electrolyte membrane.

Due to their high energy efficiency and environmental friendly properties of low contaminant emissions, fuel cells and redox flow batteries have been researched and developed as a next generation energy source.

A core constituent in a fuel cell and a redox flow battery is a polymer electrolyte membrane capable of cation exchange, and properties of 1) excellent proton conductivity, 2) preventing electrolyte crossover, 3) high chemical resistance, 4) strengthening mechanical properties and/or 4) low swelling ratio are favorably required.

DISCLOSURE

Technical Problem

The present specification is directed to providing an ion exchange membrane, an electrochemical cell, a flow battery and a fuel cell comprising the same, and a method for manufacturing the same.

Technical Solution

One embodiment of the present specification provides an ion exchange polymer membrane having an ion channel provided with an ion transferring group, the ion exchange polymer membrane including a bonding structure formed by one, two or more of the ion transferring groups and at least one of a compound represented by the following Chemical Formula 1 and a compound represented by the following Chemical Formula 2.

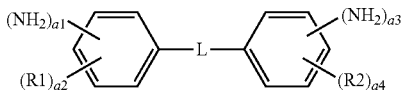
[Chemical Formula 1]

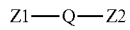
[Chemical Formula 2]

In Chemical Formulae 1 and 2, R1 and R2 are each hydrogen, an alkyl group or a sulfonic acid group, L is a direct bond, —O—, —S—, —NH— or —$SO_2$—, Q is an alkylene group, Z1 and Z2 are each —$NH_2$ or a sulfonic acid group, a1 and a3 are each 1 or 2, a2 and a4 are each an integer of 0 to 4, and $1 \leq a1+a2 \leq 5$ and $1 \leq a3+a4 \leq 5$.

Another embodiment of the present specification provides an electrochemical cell comprising an anode, a cathode, and the ion exchange membrane provided between the anode and the cathode.

Another embodiment of the present specification provides a flow battery comprising an anode, a cathode, and the ion exchange membrane provided between the anode and the cathode.

Another embodiment of the present specification provides a membrane electrode assembly comprising an anode, a cathode, and the ion exchange membrane provided between the anode and the cathode.

Another embodiment of the present specification provides a fuel cell comprising the membrane electrode assembly.

Another embodiment of the present specification provides a method for manufacturing an ion exchange polymer membrane comprising preparing an ion exchange polymer membrane having an ion channel provided with an ion transferring group; and forming a bonding structure by one, two or more of the ion transferring groups of the ion exchange polymer membrane and at least one of a compound represented by the following Chemical Formula 1 and a compound represented by the following Chemical Formula 2 using a composition comprising at least one of a compound represented by the following Chemical Formula 1 and a compound represented by the following Chemical Formula 2.

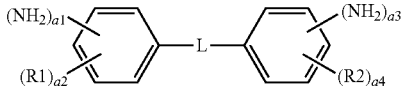
[Chemical Formula 1]

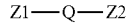
[Chemical Formula 2]

In Chemical Formulae 1 and 2, R1 and R2 are each hydrogen, an alkyl group or a sulfonic acid group, L is a direct bond, —O—, —S—, —NH— or —$SO_2$—, Q is an alkylene group, Z1 and Z2 are each —$NH_2$ or a sulfonic acid group, a1 and a3 are each 1 or 2, a2 and a4 are each an integer of 0 to 4, and $1 \leq a1+a2 \leq 5$ and $1 \leq a3+a4 \leq 5$.

Advantageous Effects

An ion exchange membrane according to the present specification can be controlled so as to select and migrate specific ions.

An ion exchange membrane according to the present specification has an advantage of a low crossover.

DESCRIPTION OF DRAWINGS

FIG. 1 is a schematic diagram showing a principle of electricity generation of a fuel cell.

FIG. 2 is a diagram schematically illustrating a structure of a membrane electrode assembly for a fuel cell.

FIG. 3 is a diagram schematically illustrating one example of a fuel cell.

FIG. 4 is a sectional diagram illustrating a general structure of a flow battery.

FIG. 5 is a conceptual diagram of one embodiment of the present specification.

FIG. 6 is a UV absorption spectrum of Experimental Example 1.

FIG. 7 is a graph measuring X-ray photoelectron spectroscopy (XPS) of Experimental Example 2.

FIG. 8 is a graph of transmission mode small-angle X-ray scattering (SAXS) of Experimental Example 4.

FIG. 9 is a graph showing charge and discharge (500 times) results of Experimental Example 5.

FIG. 10 is a graph showing a result of measuring OCV of Experimental Example 6.

<Reference Numeral>

| | |
|---|---|
| 10: | Electrolyte Membrane |
| 20, 21: | Catalyst Layers |
| 40, 41: | Gas Diffusion Layers |
| 50: | Cathode |
| 51: | Anode |
| 60: | Stack |
| 70: | Oxidizer Supply Unit |
| 80: | Fuel Supply Unit |
| 81: | Fuel Tank |
| 82: | Pump |
| 100: | Housing |
| 200: | Separator |
| 400: | Anode |
| 410: | Anode Inlet |
| 420: | Anode Outlet |
| 500: | Cathode |
| 510: | Cathode Inlet |
| 520: | Cathode Outlet |

MODE FOR DISCLOSURE

Hereinafter, the present specification will be described in detail.

An ion exchange membrane is one of core factors forming a fuel cell, a flow battery or the like, and the ion exchange membrane needs to selectively pass ions through while separating a cathode and an anode. In most cases, protons need to smoothly migrate, and in a vanadium flow battery, lowering a crossover of vanadium ions, an electrode active material, while migrating protons functions as an important factor in obtaining excellent performance.

An ion channel or a water channel is formed by linking ion clusters formed by aggregation of functional groups of ion exchange groups of a separator. Spacing between or sizes of ion channels, that is, ion aggregates (ion clusters) vary depending on the amount of water or an electrolytic solution included in the separator. In a Nafion separator, a size of an ion channel increases to 3.1 nm to 4.6 nm as the water content included in the separator increases to 10 wt % to 35 wt % (@relative humidity 100%) when measuring through an X-ray small-angle scattering test. In addition, in a hydrocarbon polymer, an ion channel is known to form to a 3 nm to 4 nm size, which is smaller than the ion channel of Nafion. The ion channel size (3 nm to 4.6 nm) of an ion exchange resin mentioned above is large to selectively pass hydrogen ions through.

Sizes of ion functional group aggregates (ion clusters) of the ion exchange polymer membrane, that is, a size of the ion channel of the ion exchange polymer membrane at relative humidity (RH) 100% or in a state of being completely wet in an electrolytic solution may be less than 5 nm.

Sizes of ion functional group aggregates (ion clusters) of the ion exchange polymer membrane, that is, a size of the ion channel of the ion exchange polymer membrane at relative humidity (RH) 100% or in a state of being completely wet in an electrolytic solution may be less than 4 nm.

Meanwhile, the present disclosure relates to a separator gone through chemical treatment of linking an ion transferring group of an ion exchange resin and a monomer having two or more functional groups through covalent bonds as shown in FIG. 5 in order to increase selective permeation of hydrogen ions. An ion channel size may be controlled depending on the monomer size due to covalent bonds formed between the monomer and the ion transferring group. The functional group of the monomer may change electrochemical properties of an ion exchange polymer membrane.

In a cation exchange polymer membrane, the ion transferring group of the ion exchange polymer membrane may be represented by -(A)$^-$(H)$^+$, and for example, may be —SO$_3^-$X. Herein, X is a monovalent cation. When the ion transferring group of the ion exchange polymer membrane is —(SO$_3$H), a sulfonamide bonding structure (—SO$_2$—NH—) may be introduced to the ion exchange polymer membrane through a chemical reaction between —(SO$_3$H) of the ion exchange polymer membrane and a monomer having an amine group (—NH$_2$) as the functional group.

In an anion exchange polymer membrane, the ion transferring group of the ion exchange polymer membrane may be represented by —(B)$^+$(OH)$^-$, and for example, may be —NO$^+$OH$^-$. When the ion transferring group of the ion exchange polymer membrane is —NO$_3^+$OH$^-$, a sulfonamide bonding structure (—SO$_2$—NH—) may be introduced to the ion exchange polymer membrane through a chemical reaction between —NO$_3^+$OH$^-$ of the ion exchange polymer membrane and a monomer having a sulfonic acid group (—SO$_3$H) as the functional group.

The present specification provides an ion exchange polymer membrane having an ion channel provided with an ion transferring group, the ion exchange polymer membrane including a bonding structure formed by one, two or more of the ion transferring groups and at least one of a compound represented by the following Chemical Formula 1 and a compound represented by the following Chemical Formula 2.

[Chemical Formula 1]

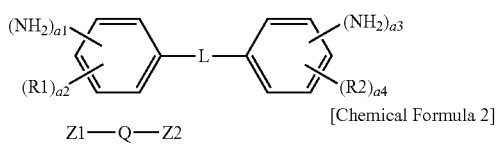

[Chemical Formula 2]

Z1—Q—Z2

In Chemical Formulae 1 and 2, R1 and R2 are each hydrogen, an alkyl group or a sulfonic acid group, L is a direct bond, —O—, —S—, —NH— or —SO$_2$—, Q is an alkylene group, Z1 and Z2 are each —NH— or a sulfonic acid group, a1 and a3 are each 1 or 2, a2 and a4 are each an integer of 0 to 4, and $1 \leq a1+a2 \leq 5$ and $1 \leq a3+a4 \leq 5$.

The two or more R1s may be the same as or different from each other, and the two or more R2s may be the same as or different from each other.

Lengths of the compound represented by Chemical Formula 1 and the compound represented by Chemical Formula 2 may be 40 nm or less, and specifically 30 nm or less. A hydrophobic block and a hydrophilic block of an ion exchange resin in the ion exchange polymer membrane are approximately 30 nm to 40 nm apart, and in this case, the hydrophobic block and the hydrophilic block may be connected.

Lengths of the compound represented by Chemical Formula 1 and the compound represented by Chemical Formula 2 may be greater than or equal to 1 nm and less than or equal to 4 nm.

A distance between ion channels (ion clusters) is approximately 3 nm to 4 nm, and in this case, when an ion channel polymer membrane bonding to an ion transferring group inside the ion channel is swollen, the ion channel expansion may be suppressed and the size of the ion channel may be controlled.

When the compound represented by Chemical Formula 1 and one, two or more of the ion transferring groups that are —SO$_3$_X (herein, X is a monovalent cation) form a bonding structure, the bonding structure may include at least one of bonding structures represented by the following Chemical Formulae 3 to 7.

In Chemical Formulae 3 to 7, R3 to R6 are each hydrogen, an alkyl group or a sulfonic acid group, L1 and L2 are each a direct bond, —O—, —S—, —NH— or —SO$_2$—, b1 and b3 are each 0 or 1, b2 and b4 are each an integer of 0 to 4, $0 \leq b1+b2 \leq 4$ and $0 \leq b3+b4 \leq 4$, c1 and c2 are each an integer of 0 to 3, c3 is 1 or 2, c4 is an integer of 0 to 4 and $1 \leq c3+c4 \leq 5$, c5 is 0 or 1, c6 is an integer of 0 to 4 and $0 \leq c5+c6 \leq 4$, and

represents a bonding site.

The two or more R3s may be the same as or different from each other, the two or more R4s may be the same as or different from each other, the two or more R5s may be the same as or different from each other, and the two or more R6s may be the same as or different from each other.

When the compound represented by Chemical Formula 1 and one, two or more of the ion transferring groups that are —NH$_3$$^+$OH$^-$ form a bonding structure, the bonding structure may include at least one of bonding structures represented by the following Chemical Formulae 8 to 12.

[Chemical Formula 3]

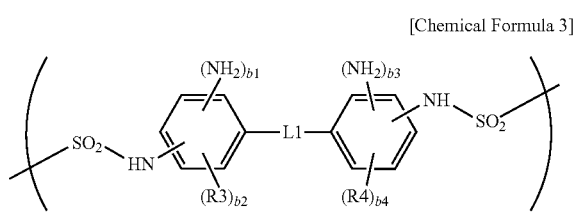

[Chemical Formula 4]

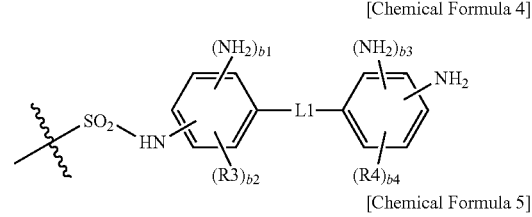

[Chemical Formula 5]

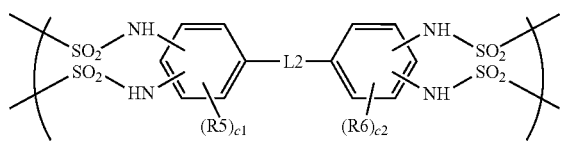

[Chemical Formula 6]

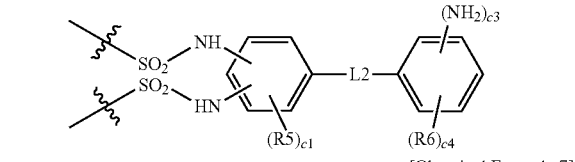

[Chemical Formula 7]

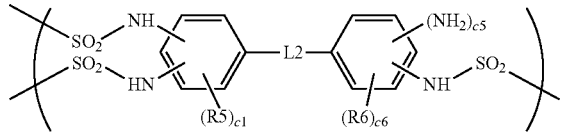

[Chemical Formula 8]

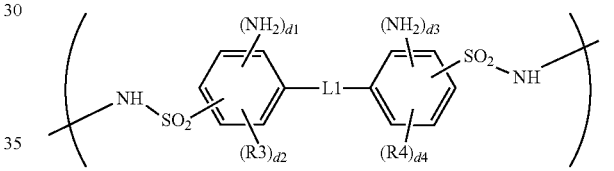

[Chemical Formula 9]

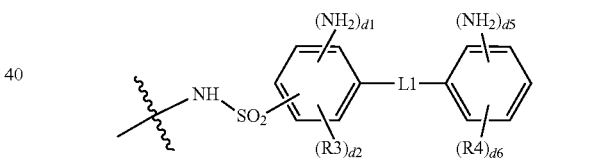

[Chemical Formula 10]

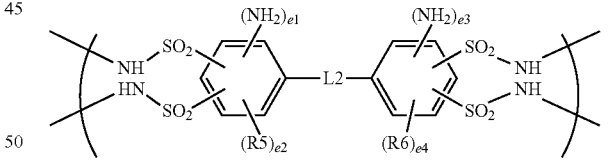

[Chemical Formula 11]

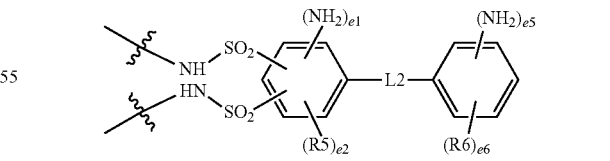

[Chemical Formula 12]

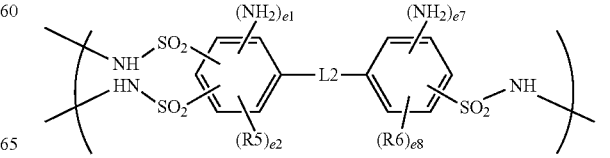

In Chemical Formulae 8 to 12, R3 to R6 are each hydrogen, an alkyl group or a sulfonic acid group, L1 and L2 are each a direct bond, —O—, —S—, —NH— or —SO$_2$—, d1, d3 and d5 are each 1 or 2, d2 and d4 are each an integer of 0 to 3, d6 is an integer of 0 to 4, $1 \leq d1+d2 \leq 4$, $1 \leq d3+d4 \leq 4$ and $1 \leq d5+d6 \leq 5$, e1, e3, e5 and d7 are each 1 or 2, e2 and e4 are each an integer of 0 to 2, e6 is an integer of 0 to 4, e8 is an integer of 0 to 3, and $1 \leq e1+e2 \leq 3$, $1 \leq e3+e4 \leq 3$, $1 \leq e5+e6 \leq 5$ and $1 \leq e7+e8 \leq 4$.

The two or more R3s may be the same as or different from each other, the two or more R4s may be the same as or different from each other, the two or more R5s may be the same as or different from each other, and the two or more R6s may be the same as or different from each other.

When the compound represented by Chemical Formula 2 and one or more ion transferring groups including any one of —NH$_3^+$OH$^-$ and —SO$_3^-$X (herein, X is a monovalent cation) form a bonding structure, the bonding structure may include at least one of bonding structures represented by the following Chemical Formulae 13 to 16.

[Chemical Formula 13]

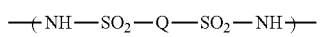

[Chemical Formula 14]

[Chemical Formula 15]

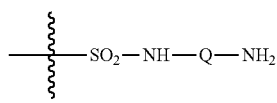

[Chemical Formula 16]

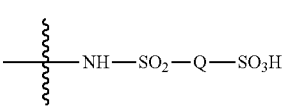

In Chemical Formulae 13 to 16, Q is an alkylene group.

Due to monomer treatment of the present specification, the monomer and the ion transferring group of the ion exchange resin are linked through covalent bonds, and effects such as crosslinking, filling and ion repulsive force may be expected.

When only one functional group of the monomer of the present specification bonds to the ion transferring group of the ion exchange polymer membrane, a crosslinking effect may be small, however, the monomer is linked to an ion channel having an effect of filling space of the ion channel. In addition, the non-bonding amine functional group of the monomer has repulsive force for vanadium ions, which is effective in reducing vanadium ion permeability.

When functional groups of the monomer at both ends all bond with two or more ion transferring groups of the ion exchange polymer membrane, there may be an effect of limiting the distance between maximally swollen ion channels to the bonded monomer length regardless of relative humidity and contacted electrolytic solution. In addition, as the number of crosslinked functional groups increases, such a limiting effect of swelling may increase.

The ion exchange polymer membrane may be a fluorine-based ion exchange polymer membrane, a partial fluorine-based ion exchange polymer membrane or a hydrocarbon-based ion exchange polymer membrane. Preferably, the ion exchange polymer membrane may be DuPont Nafion, Solvay Aquvion or 3M ionomer, a fluorine-based polymer. The fluorine-based polymers have a different ion exchange functional group, a side chain, for each polymer repeating unit on a main chain (backbone). An ion channel is favorably formed due to this side chain, but, a larger ion channel is formed compared to a partial fluorine-based or hydrocarbon polymer. In a fluorine-based polymer, because permeation of an electrolytic solution or fuel such as hydrogen other than hydrogen ion may be severe, a fluorine-based polymer having a side chain may have a bigger effect obtained by covalent bonds of the compound of the present specification.

In the present specification, the alkyl group may be linear or branched, and, although not particularly limited thereto, the number of carbon atoms may be from 1 to 20 and is preferably from 1 to 10. Specific examples thereof may include a methyl group, an ethyl group, a propyl group, an isopropyl group, a butyl group, a t-butyl group, a pentyl group, a hexyl group, a heptyl group and the like, but are not limited thereto.

The definitions on the alkyl group may be applied to the alkylene group except that it is a divalent alkane group. Specifically, the number of carbon atoms of the alkylene group may be from 2 to 10.

The present specification provides an electrochemical cell comprising an anode, a cathode and the ion exchange membrane provided between the anode and the cathode.

The cathode means an electrode reduced by receiving electrons when discharged, and may be an anode (oxidation electrode) oxidized and emitting electrons when charged. The anode means an electrode oxidized and emitting electrode when discharged, and may be a cathode (reduction electrode) reduced by receiving electrons when charged.

The electrochemical cell means a battery using chemical reactions, and the type is not particularly limited as long as it is provided with a polymer electrolyte membrane, and for example, the electrochemical cell may be a fuel cell, a metal secondary battery or a flow battery.

The present specification provides an electrochemical cell module comprising the electrochemical cell as a unit cell.

The electrochemical cell module may be formed by inserting a bipolar plate between the unit cells according to one embodiment of the present application, and stacking the result.

The cell module may specifically be used as a power source of electric vehicles, hybrid electric vehicles, plug-in hybrid electric vehicles or power storage systems.

The present specification provides a flow battery comprising an anode, a cathode and the ion exchange membrane provided between the anode and the cathode.

The flow battery of the present specification may further comprise an anode tank and a cathode tank comprising an anode electrolytic solution or a cathode electrolytic solution, respectively; a pump connected to the anode tank and the cathode tank to supply the electrolytic solution to the anode or the cathode; an anode inlet (410) and a cathode inlet (510) to which the anode electrolytic solution or the cathode electrolytic solution inflowed, respectively, from the pump; and an anode outlet (420) and a cathode outlet (520) discharging the electrolytic solution from the anode (400) or the cathode (500) to the anode tank and the cathode tank, respectively.

The present specification provides a membrane electrode assembly comprising an anode, a cathode, and the ion exchange membrane provided between the anode and the cathode.

The present specification provides a fuel cell comprising the membrane electrode assembly.

FIG. 1 is a diagram schematically showing a principle of electricity generation of a fuel cell, and a most basic unit generating electricity in a fuel cell is a membrane electrode assembly (MEA), which is formed with an electrolyte membrane (M), and an anode (A) and a cathode (C) formed on both surfaces of this electrolyte membrane (M). When referring to FIG. 1 showing a principle of electricity generation of a fuel cell, an oxidation reaction of fuel (F) such as hydrogen, methanol or hydrocarbon such as butane occurs in an anode (A) to generate hydrogen ions ($H^+$) and electrons ($e^-$), and the hydrogen ions migrate to a cathode (C) through an electrolyte membrane (M). In the cathode (C), the hydrogen ions transferred through the electrolyte membrane (M), an oxidizer (O) such as oxygen, and electrons react to produce water (W). Through such a reaction, electrons migrate to an external circuit.

FIG. 2 schematically illustrating a structure of a membrane electrode assembly for a fuel cell, and the membrane electrode assembly for a fuel cell may be provided with an electrolyte membrane (10), and a cathode (50) and an anode (51) placed opposite to each other with this electrolyte membrane (10) in between. The cathode may be provided with a cathode catalyst layer (20) and a cathode gas diffusion layer (40) consecutively from the electrolyte membrane (10), and the anode may be provided with an anode catalyst layer (21) and an anode gas diffusion layer (41) consecutively from the electrolyte membrane (10).

FIG. 3 schematically illustrating a structure of a fuel cell, and the fuel cell is formed comprising a stack (60), an oxidizer supply unit (70) and a fuel supply unit (80).

The stack (60) comprises one, two or more of the membrane-electrode assemblies described above, and when two or more of the membrane-electrode assemblies are comprised of, a separator provided therebetween is comprised of. The separator prevents the membrane-electrode assemblies from being electrically connected, and performs a role of transferring fuel and oxidizer supplied from the outside to the membrane-electrode assemblies.

The oxidizer supply unit (70) performs a role of supplying an oxidizer to the stack (60). As the oxidizer, oxygen is typically used, and oxygen or air may be injected with a pump (82).

The fuel supplying unit (80) performs a role supplying fuel to the stack (60), and may be formed with a fuel tank (81) storing fuel, and a pump (82) supplying the fuel stored in the fuel tank (81) to the stack (60). As the fuel, hydrogen or hydrocarbon fuel in a gas or liquid state may be used. Examples of the hydrocarbon fuel may include methanol, ethanol, propanol, butanol or natural gas.

The present specification provides a method for manufacturing an ion exchange polymer membrane comprising preparing an ion exchange polymer membrane having an ion channel provided with an ion transferring group; and forming a bonding structure by one, two or more of the ion transferring groups of the ion exchange polymer membrane and at least one of a compound represented by the following Chemical Formula 1 and a compound represented by the following Chemical Formula 2 using a composition including at least one of a compound represented by the following Chemical Formula 1 and a compound represented by the following Chemical Formula 2.

[Chemical Formula 1]

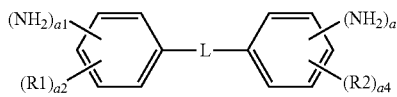

-continued $$Z1-Q-Z2 \quad \text{[Chemical Formula 2]}$$

In Chemical Formulae 1 and 2, R1 and R2 are each hydrogen, an alkyl group or a sulfonic acid group, L is a direct bond, —O—, —S—, —NH— or —$SO_2$—, Q is an alkylene group, Z1 and Z2 are each —$NH_2$ or a sulfonic acid group, a1 and a3 are each 1 or 2, a2 and a4 are each an integer of 0 to 4, and $1 \leq a1+a2 \leq 5$ and $1 \leq a3+a4 \leq 5$.

The method for manufacturing an ion exchange membrane may cite descriptions provided above for the ion exchange membrane.

The forming of a bonding structure may comprise impregnating the ion exchange polymer membrane into a composition including at least one of the compound represented by Chemical Formula 1 and the compound represented by Chemical Formula 2.

After preparing a solution by dissolving the compound to treat in a solvent, the polymer film is impregnated by being immersed into the solution for a certain period of time. After that, the monomer smeared on the surface or physically attached is washed away with a solvent favorably dissolving the treated compound (monomer).

Herein, the time of impregnation may be adjusted depending on conditions such as a treatment condition and types of the polymer membrane, however, the time may be from 60 minutes to 90 minutes.

A molar ratio between the ion transferring group of the ion exchange polymer membrane and at least one of the compound represented by Chemical Formula 1 and the compound represented by Chemical Formula 2 in the composition may be greater than or equal to 1:0.01 and less than or equal to 1:0.8.

Hereinafter, the present specification will be described in detail with reference to examples. However, the following examples are for illustrative purposes only, and are not to limit the present specification.

EXAMPLE

A Nafion polymer membrane was impregnated into a treating solution, and a sulfonic acid group of an ion channel and a compound of the following A1 or B1 were reacted in a concentration as shown in Table 1.

As the solvent of the treating solution, polar solvents such as cyclopentanone, THF, dioxane, acetonitrile or acetone may be used. In the present disclosure, a separator having a size of 10 cm×10 cm was treated by being impregnated into a 250 cc monomer solution for 90 minutes at room temperature.

TABLE 1

| Category (Separator) | Monomer Type | Concentration of Amine Monomer of Treating Solution [# Number of Amine Monomer]/ [# Number of Sulfonic Acid Group] |
|---|---|---|
| Comparative Example (Nafion) | — | — |
| Example 1 | B1 | 0.093 |
| Example 2 | B1 | 0.185 |
| Example 3 | B1 | 0.278 |
| Example 4 | A1 | 0.091 |
| Example 5 | A1 | 0.185 |
| Example 6 | A1 | 0.375 |
| Example 7 | A1 | 0.550 |

TABLE 1-continued

| Category (Separator) | Monomer Type | Concentration of Amine Monomer of Treating Solution [# Number of Amine Monomer]/ [# Number of Sulfonic Acid Group] |
|---|---|---|
| Example 8 | A1 | 0.750 |
| Example 9 | A1 | 1.500 |

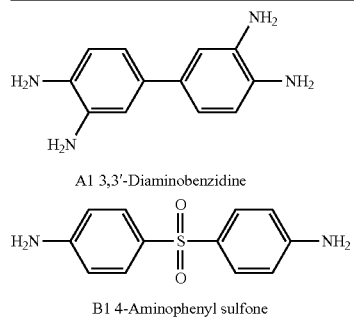

A1 3,3'-Diaminobenzidine

B1 4-Aminophenyl sulfone

Experimental Example 1

The polymer membranes treated in Examples 5, 6 and 8 were each irradiated with UV, and results of observing absorption wavelengths are shown in FIG. 6. According to FIG. 6, characteristic absorption peaks obtained from Monomer A1 were observed, and it was seen that the characteristic absorption peaks increased depending on the concentration.

Experimental Example 2

X-ray Photoelectron Spectroscopy (XPS)

Results of measuring X-ray photoelectron spectroscopy (XPS) for the polymer membranes treated in Comparative Example and Example 5 are shown in FIG. 7. FIG. 7 shows (a) survey scan spectrum and (b) C 1s, N is narrow scan spectrum of the untreated separator, and (c) survey scan spectrum and (d) C1s, N1s narrow scan spectrum of the polymer membrane (A1_0.185) chemically treated in Example 5.

As shown in FIG. 7, formation of covalent bonds (sulfonamide, —SO$_2$—NH—) between an amine group (—NH$_2$) of the monomer and a sulfonic acid group (—SO$_3$H) of the polymer membrane was identified through X-ray photoelectron spectroscopy (XPS), and a ratio of chemical bonds and physical bonds was calculated. Specifically, in order to identify the formation of covalent bonds (sulfonamide, —SO$_2$—NH—) between an amine group (—NH) of the untreated separator (Nafion) and the chemically treated polymer membrane (A1_0.185) and a sulfonic acid group (—SO$_3$H) of the polymer membrane, bonding energy of nitrogen (N) was measured using an XPS experiment. It was seen that bonding (—C—HN—SO$_2$—) energy of nitrogen forming bonds with sulfur (S) of the sulfonic acid group was higher than bonding (—C—NH$_2$) energy (~400 eV) of nitrogen remaining as an amine group. In addition, when comparing the graph of the untreated separator (graph Ab (right side)) and the graph of the chemically treated polymer membrane (graph Ad (right side)), a nitrogen bonding energy peak of the treated separator (A1_0.185) was observed in the form of two peaks overlapping each other, and the nitrogen bonding may be considered to have two types. These two peaks were divided into a peak having high energy due to bonding between sulfur and nitrogen and a peak of the amine group having low energy in an unreacted state, and areas thereof were calculated, and a ratio of the bonding number of each of them was obtained. The results are summarized as in Table 2.

From FIG. 7, it was seen that the introduced monomer was linked to sulfonic acid of the separator through —(SO$_2$—NH)-bonding. In addition, from the following Table 2, the relative number of bonds between the monomer and the sulfonic acid —(SO$_2$—NH)—(N—S bonding) and the number of H$_2$N—(N—C bonding) that did not form bonds may be obtained.

TABLE 2

| Separator | N | | | F | S |
| | N-S | N-C | N_Total | | |
|---|---|---|---|---|---|
| Comparative Example | 0.00 | 0.00 | 0.00 | 93.33 | 1.00 |
| Example 5 | 0.24 | 0.10 | 0.33 | 78.29 | 1.00 |

Experimental Example 3

Vanadium Permeability

Using an experimental device self-manufactured referencing a literature (Journal of Power Sources, 2011, 196, 482), a concentration of permeating tetravalent vanadium ions (V$^{4+}$) was measured depending on time, and the results are shown in Table 3. A vanadium ion diffusion coefficient of the separator is obtained through the Fick's diffusion law, and therefore, vanadium permeability per unit area and unit time may be relatively compared.

TABLE 3

| Sample | Comparative Example | Example 4 0.091 | Example 5 0.185 | Example 3 0.278 | Example 6 0.375 | Example 7 0.550 | Example 8 0.750 | Example 9 1.500 |
|---|---|---|---|---|---|---|---|---|
| Vanadium Permeability (cm$^2$/min) × 10$^{-6}$ | 5.84 | 5.72 | 3.68 | 4.49 | 4.51 | 4.95 | 3.64 | 5.69 |

It was observed that permeability of the treated separator all decreased compared to untreated Comparative Example.

Experimental Example 4

Transmission Mode Small-Angle X-Ray Scattering (T-SAXS)

Inside the polymer was analyzed using transmission mode small-angle X-ray scattering (T-SAXS) in which X-rays transmit the polymer. As for the sample, a completely dried film (dry) and a film completely impregnated into water and stored therein for a long period of time (wet) were measured, and the results are shown in FIG. 8 and Tables 4 and 5.

TABLE 4

| Separator | Dry Peak Location (q (Å⁻¹)) | Dry Ion Channel Spacing [D (nm)] | Wet Peak Location (q (Å⁻¹)) | Wet Ion Channel Spacing [D (nm)] |
|---|---|---|---|---|
| Comparative Example | 0.19 | 3.31 | 1.55 | 4.05 |
| Example 6 | 0.18 | 3.27 | 0.16 | 3.82 |

Based on the ion channel size observation in a dry state and an impregnated (wet) state, it was seen that the separator treated in Example 6 was smaller than untreated Comparative Example. As a result, it was seen that, due to the introduction of the monomer, vanadium ion permeability decreased with a decrease in the ion channel size (Table 3).

TABLE 5

| Sample | Comparative Example | Example 4 0.091 | Example 5 0.185 | Example 3 0.278 | Example 6 0.375 | Example 7 0.550 | Example 8 0.750 | Example 1.500 |
|---|---|---|---|---|---|---|---|---|
| Ion Channel Spacing (nm) | 4.30 | 3.90 | 4.01 | 3.92 | 3.82 | 3.86 | 3.99 | 4.30 |

Based on the SAXS experimental results of Table 5, the ion channel size decreased when the concentration of the chemically treated monomer increased from 0.0 to 0.375, and the ion channel size tended to increase again when the monomer concentration increased to greater than 0.55. Ion channel spacing of the separated treated with the monomer having a concentration of 0.091 to 0.75 was all smaller than the untreated separator.

Experimental Example 5

Evaluation on Charge and Discharge in Single Cell

Long-term charge and discharge (500 times) of the polymer membranes treated in Examples 5, 6 and 8 were evaluated through a Single Cell, and the results are shown in FIG. 9 and Table 6.

As the Single Cell, a Single Cell having an active area of 5 cm×5 cm was used, and as the electrode, carbon felt was used, and as the electrolytic solution, a 1 M vanadium and 3 M sulfuric acid aqueous solution was used.

TABLE 6

| | | @ 500 Cycle | | |
|---|---|---|---|---|
| | | CE (%) | VE (%) | EE (%) |
| Comparative Example | | 97.1 | 90.4 | 87.8 |
| Example 5 | 0.185 | 97.4 | 91.3 | 89.0 |
| Example 6 | 0.375 | 98.1 | 91.4 | 89.7 |
| Example 8 | 0.750 | 98.3 | 91.5 | 89.9 |

(a) Charge Efficiency (CE) (b) Voltage Efficiency (VE), (c) Energy Efficiency (EE)

Based on the long-term Single Cell test results, the separator treated with a Monomer A1 concentration of greater than 0 and less than or equal to 0.75 (0.185, 0.375, 0.75) exhibited excellent properties in all of capacity, capacity decrease, charge efficiency [CE], voltage efficiency [VE] and energy efficiency [EE] compared to the untreated separator (Nafion 115).

In addition, when comparing cathode and anode electrolytes after 500 times of charge and discharge, it was seen that an electrolytic solution crossover was reduced at initial 50 ml in the Single Cell using the chemically treated separator compared to Nafion.

TABLE 7

| Separator | | Electrolytic solution Volume (ml)@ 500 Times of Charge and Discharge Anode (2+/3+) | Cathode (4+/5+) | Crossover (%) |
|---|---|---|---|---|
| Comparative Example | | 25 | 64 | 39% |
| Example 5 | 0.185 | 33 | 52 | 19% |

TABLE 7-continued

| Separator | | Electrolytic solution Volume (ml)@ 500 Times of Charge and Discharge Anode (2+/3+) | Cathode (4+/5+) | Crossover (%) |
|---|---|---|---|---|
| Example 6 | 0.375 | 29 | 54 | 25% |
| Example 8 | 0.750 | 31 | 55 | 24% |

Changes in Electrolytic solution Volume after Long-Term Charge and Discharge (500 Times of Charge and Discharge) Test in Single Cell Experimental Example 6

Open Circuit Voltage (OCV) Measurement

After charging a Single Cell, a voltage decrease (1.70 V→0.72 V) was measured depending on time without applying a current or voltage. This is a battery self-discharge test, and in the case of a redox flow battery, is a method of investigating vanadium permeability in the battery.

Results of measuring OCV of the separator treated in Example 6 are shown in FIG. 10.

As a result of OCV measurements, time for voltage decrease (1.70 volt→0.72 volt) increased by 1.9 times compared to the membrane before treatment. This indicated that, while driving a battery, the chemically treated separator of Example 6 reduced vanadium ion permeation compared to the untreated membrane of Comparative Example, and was slowly discharged while maintaining a voltage.

The invention claimed is:

1. An ion exchange polymer membrane having an ion channel provided with an ion transferring group, comprising:
    a bonding structure formed by at least one ion transferring group comprising —$NH_3^+OH^-$ or —$SO_3^-X$, wherein X is a monovalent cation, and at least one compound of Chemical Formula 1:

Chemical Formula 1

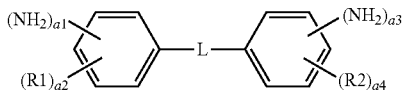

wherein, in Chemical Formula 1,
R1 and R2 are each hydrogen, an alkyl group or a sulfonic acid group;
L is a direct bond, —O—, —S—, —NH— or —SO$_2$—;
a1 and a3 are each 1 or 2;
a2 and a4 are each an integer of 0 to 4; and
$1 \leq a1+a2 \leq 5$ and $1 \leq a3+a4 \leq 5$;
wherein when the at least one ion transferring group comprises —SO$_3^-$X, the bonding structure includes at least one structure represented by the following Chemical Formulae 3 to 7:

Chemical Formula 3

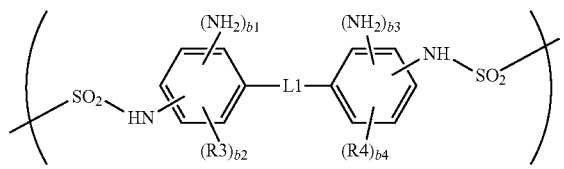

Chemical Formula 4

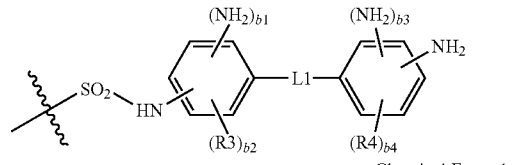

Chemical Formula 5

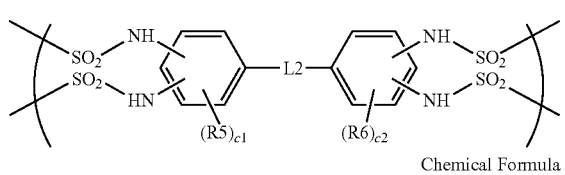

Chemical Formula 6

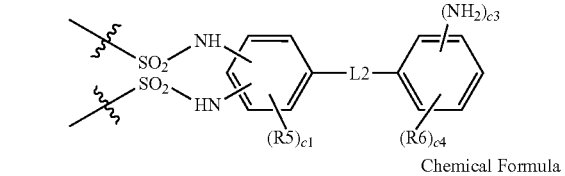

Chemical Formula 7

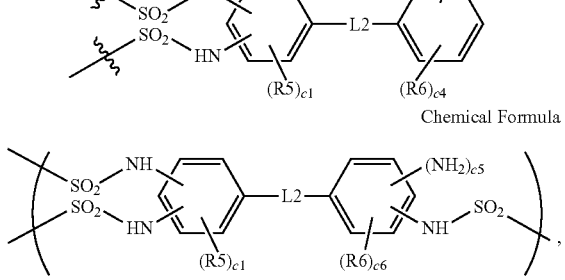

wherein in Chemical Formulae 3 to 7:
R3 to R6 are each hydrogen, an alkyl group or a sulfonic acid group;
L1 and L2 are each a direct bond, —O—, —S—, —NH— or —SO$_2$—;
b1 and b3 are each 0 or 1;
b2 and b4 are each an integer of 0 to 4;
$0 \leq b1+b2 \leq 4$ and $0 \leq b3+b4 \leq 4$;
c1 and c2 are each an integer of 0 to 3;
c3 is 1 or 2, c4 is an integer of 0 to 4 and $1 \leq c3+c4 \leq 5$;
c5 is 0 or 1, c6 is an integer of 0 to 4 and $0 \leq c5+c6 \leq 4$; and

represents a bonding site; and
wherein when the at least one ion transferring group comprises —NH$_3^+$OH$^-$, the bonding structure includes at least one structure represented by the following Chemical Formulae 8 to 12:

Chemical Formula 8

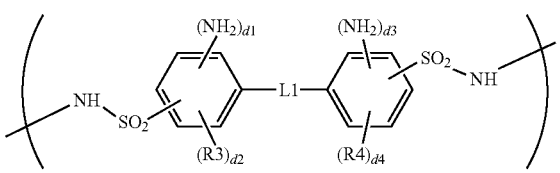

Chemical Formula 9

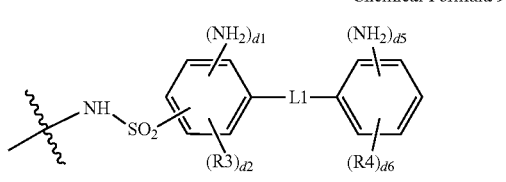

Chemical Formula 10

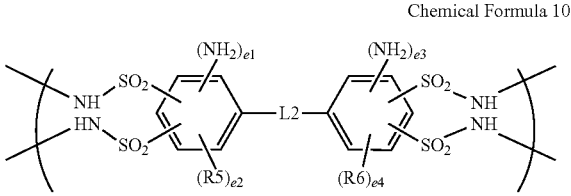

Chemical Formula 11

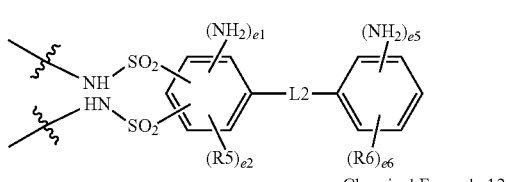

Chemical Formula 12

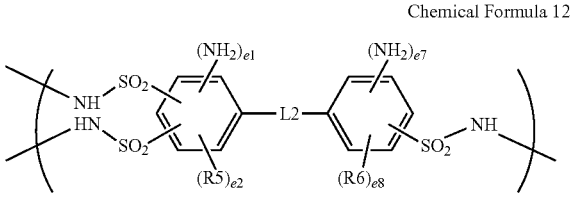

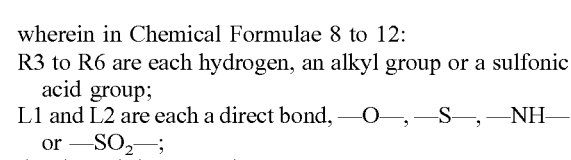

wherein in Chemical Formulae 8 to 12:
R3 to R6 are each hydrogen, an alkyl group or a sulfonic acid group;
L1 and L2 are each a direct bond, —O—, —S—, —NH— or —SO$_2$—;
d1, d3 and d5 are each 1 or 2;
d2 and d4 are each an integer of 0 to 3;
d6 is an integer of 0 to 4;
$1 \leq d1+d2 \leq 4$, $1 \leq d3+d4 \leq 4$ and $1 \leq d5+d6 \leq 5$;
e1, e3, e5 and e7 are each 1 or 2;
e2 and e4 are each an integer of 0 to 2;
e6 is an integer of 0 to 4;

e8 is an integer of 0 to 3; and

1≤e1+e2≤3, 1≤e3+e4≤3, 1≤e5+e6≤5 and 1≤e7+e8≤4.

2. The ion exchange polymer membrane of claim 1, wherein lengths of the compound represented by Chemical Formula 1 are greater than or equal to 1 nm and less than or equal to 4 nm.

3. The ion exchange polymer membrane of claim 1, wherein a size of the ion channel of the ion exchange polymer membrane at relative humidity (RH) 100% or in a state of being completely wet in a electrolytic solution is less than 5 nm.

4. The ion exchange polymer membrane of claim 1, wherein the ion exchange polymer membrane is a fluorine-based ion exchange polymer membrane, a partial fluorine-based ion exchange polymer membrane or a hydrocarbon-based ion exchange polymer membrane.

5. An electrochemical cell comprising:
an anode;
a cathode; and
the ion exchange polymer membrane of claim 1 provided between the anode and the cathode.

6. A flow battery comprising:
an anode;
a cathode; and
the ion exchange polymer membrane of claim 1 provided between the anode and the cathode.

7. A membrane electrode assembly comprising:
an anode;
a cathode; and
the ion exchange polymer membrane of claim 1 provided between the anode and the cathode.

8. A fuel cell comprising the membrane electrode assembly of claim 7.

9. A method for manufacturing an ion exchange polymer membrane comprising:
preparing an ion exchange polymer membrane having an ion channel provided with an ion transferring group comprising —NH$_3^+$OH$^-$ or —SO$_3^-$X, wherein X is a monovalent cation; and
forming a bonding structure with at least one ion transferring group of the ion exchange polymer membrane and at least one compound represented by the following Chemical Formula 1, by using a composition including at least one compound represented by the following Chemical Formula 1:

[Chemical Formula 1]

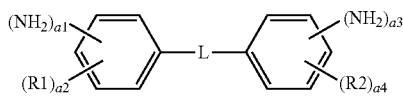

wherein, in Chemical Formula 1,
R1 and R2 are each hydrogen, an alkyl group or a sulfonic acid group;
L is a direct bond, —O—, —S—, —NH— or —SO$_2$—;
a1 and a3 are each 1 or 2;
a2 and a4 are each an integer of 0 to 4; and
1≤a1+a2≤5 and 1≤a3+a4≤5;
wherein when the at least one ion transferring group comprises —SO$_3^-$X, the bonding structure includes at least one structure represented by the following Chemical Formulae 3 to 7:

Chemical Formula 3

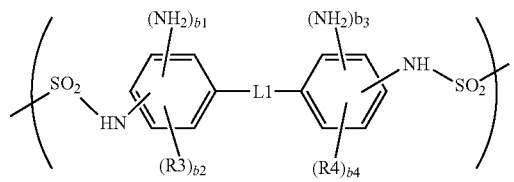

Chemical Formula 4

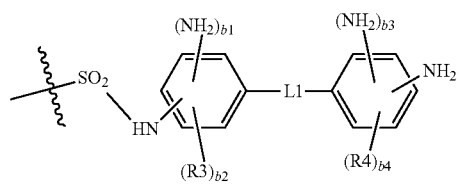

Chemical Formula 5

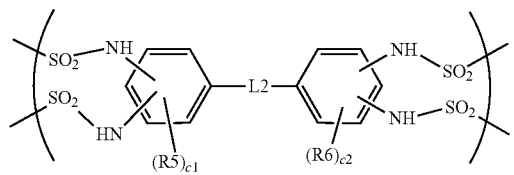

Chemical Formula 6

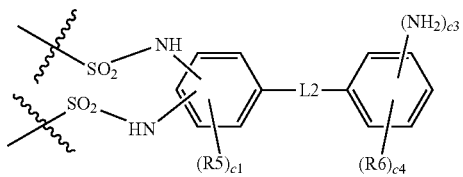

Chemical Formula 7

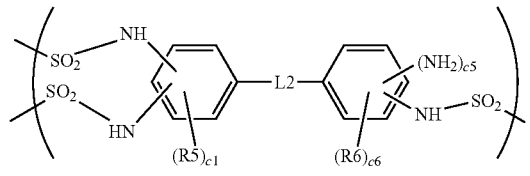

wherein in Chemical Formulae 3 to 7:
R3 to R6 are each hydrogen, an alkyl group or a sulfonic acid group;
L1 and L2 are each a direct bond, —O—, —S—, —NH— or —SO$_2$—;
b1 and b3 are each 0 or 1;
b2 and b4 are each an integer of 0 to 4;
0≤b1+b2≤4 and 0≤b3+b4≤4;
c1 and c2 are each an integer of 0 to 3;
c3 is 1 or 2, c4 is an integer of 0 to 4 and 1≤c3+c4≤5;
c5 is 0 or 1, c6 is an integer of 0 to 4 and 0≤c5+c6≤4; and

represents a bonding site; and
wherein when the at least one ion transferring group comprises —NH$_3^+$OH$^-$, the bonding structure includes at least one structure represented by the following Chemical Formulae 8 to 12:

cal Formula 1 in the composition is greater than or equal to 1:0.05 and less than or equal to 1:0.7.

12. An ion exchange polymer membrane having an ion channel provided with an ion transferring group, comprising a bonding structure represented by at least one compound represented by the following Chemical Formulae 3 to 12:

Chemical Formula 3
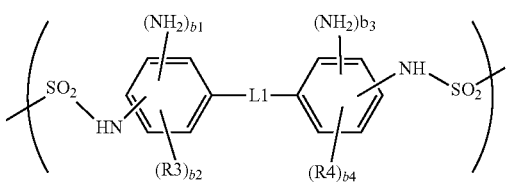

Chemical Formula 4
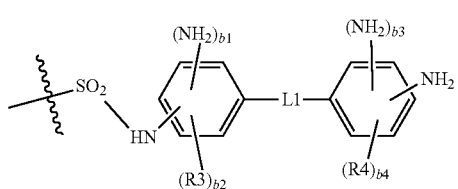

Chemical Formula 5
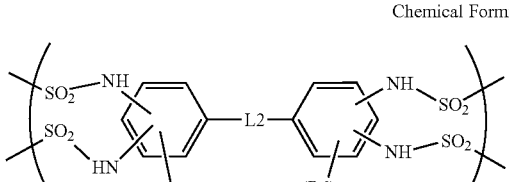

Chemical Formula 6
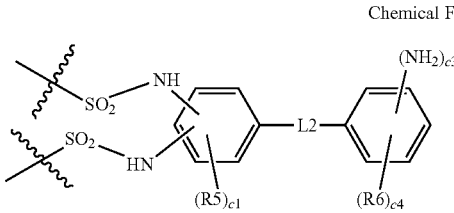

Chemical Formula 7
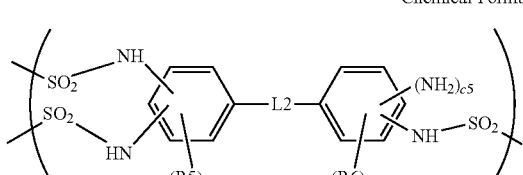

Chemical Formula 8
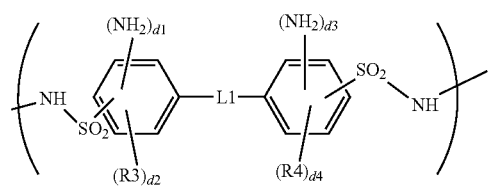

Chemical Formula 9
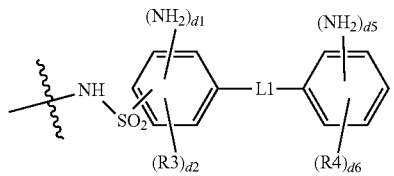

Chemical Formula 10
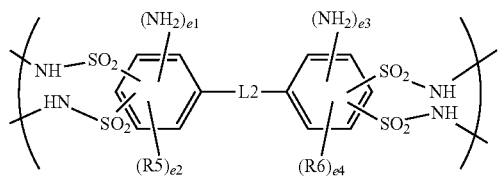

Chemical Formula 11
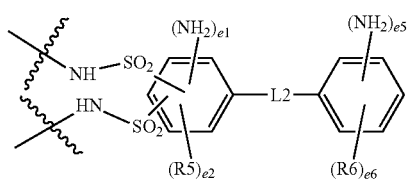

Chemical Formula 12
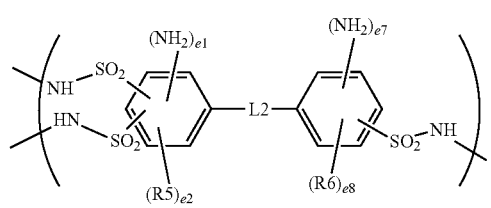

wherein in Chemical Formulae 8 to 12:
R3 to R6 are each hydrogen, an alkyl group or a sulfonic acid group;
L1 and L2 are each a direct bond, —O—, —S—, —NH— or —SO$_2$—;
d1, d3 and d5 are each 1 or 2;
d2 and d4 are each an integer of 0 to 3;
d6 is an integer of 0 to 4;
$1 \leq d1+d2 < 4$, $1 \leq d3+d4 \leq 4$ and $1 \leq d5+d6 \leq 5$;
e1, e3, e5 and d7 are each 1 or 2;
e2 and e4 are each an integer of 0 to 2;
e6 is an integer of 0 to 4;
e8 is an integer of 0 to 3; and
$1 \leq e1+e2 \leq 3$, $1 \leq e3+e4 \leq 3$, $1 \leq e5+e6 \leq 5$ and $1 \leq e7+e8 \leq 4$.

10. The method for manufacturing an ion exchange polymer membrane of claim 9, wherein the forming of a bonding structure comprises impregnating the ion exchange polymer membrane into a composition including the at least one compound represented by Chemical Formula 1.

11. The method for manufacturing an ion exchange polymer membrane of claim 9, wherein a molar ratio between the ion transferring group of the ion exchange polymer membrane and the at least one compound represented by Chemi- -continued Chemical Formula 10

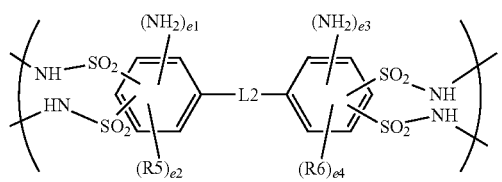

Chemical Formula 11

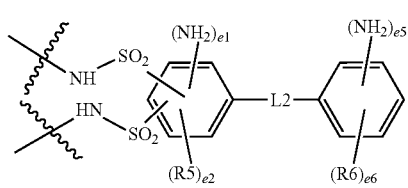

Chemical Formula 12

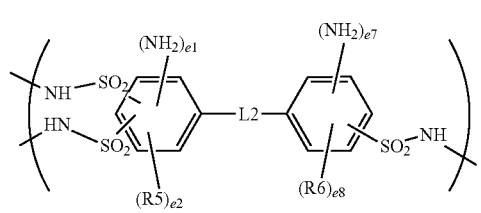

wherein in Chemical Formulae 3 to 7:
R3 to R6 are each hydrogen, an alkyl group or a sulfonic acid group;
L1 and L2 are each a direct bond, —O—, —S—, —NH— or —SO$_2$—;
b1 and b3 are each 0 or 1;
b2 and b4 are each an integer of 0 to 4;
0≤b1+b2≤4 and 0≤b3+b4≤4;
c1 and c2 are each an integer of 0 to 3;
c3 is 1 or 2, c4 is an integer of 0 to 4 and 1≤c3+c4≤5;
c5 is 0 or 1, c6 is an integer of 0 to 4 and 0≤c5+c6≤4; and

represents a bonding site; and
wherein in Chemical Formulae 8 to 12:
R3 to R6 are each hydrogen, an alkyl group or a sulfonic acid group;
L1 and L2 are each a direct bond, —O—, —S—, —NH— or —SO$_2$—;
d1, d3 and d5 are each 1 or 2;
d2 and d4 are each an integer of 0 to 3;
d6 is an integer of 0 to 4;
1≤d1+d2≤4, 1≤d3+d4≤4 and 1≤d5+d6≤5;
e1, e3, e5 and d7 are each 1 or 2;
e2 and e4 are each an integer of 0 to 2;
e6 is an integer of 0 to 4;
e8 is an integer of 0 to 3; and
1≤e1+e2≤3, 1≤e3+e4≤3, 1≤e5+e6≤5 and 1≤e7+e8≤4.

* * * * *